United States Patent [19]
Fleshren

[11] Patent Number: 5,596,568
[45] Date of Patent: Jan. 21, 1997

[54] APPARATUS FOR PROTECTING A TELECOMMUNICATIONS NETWORK FROM FALSE ALARM CONDITIONS DUE TO T1 LINE SIGNAL INTERRUPTION

[75] Inventor: Donald F. Fleshren, Richardson, Tex.

[73] Assignee: MCI Communications Corporation, Washington, D.C.

[21] Appl. No.: 459,668

[22] Filed: Jun. 2, 1995

[51] Int. Cl.⁶ .............................. H04J 3/14; H04M 3/22
[52] U.S. Cl. .......................... 370/249; 370/241; 379/23
[58] Field of Search .................... 370/16, 14, 13, 370/13.1, 15; 379/22, 23, 24, 32, 34, 221; 327/52, 89

[56] References Cited

U.S. PATENT DOCUMENTS

| | | | |
|---|---|---|---|
| 4,213,015 | 7/1980 | Kimbrough | 179/175.2 |
| 4,230,913 | 10/1980 | Brothers et al. | 179/18 |
| 4,446,340 | 5/1984 | Fryer | 179/175.3 |
| 4,480,152 | 10/1984 | Taylor | 179/81 |
| 4,538,033 | 8/1985 | Bruce et al. | 179/175 |
| 4,564,933 | 1/1986 | Hirst | 370/15 |
| 4,759,009 | 7/1988 | Casady et al. | 370/55 |
| 4,771,449 | 9/1988 | Kiko et al. | 379/97 |
| 4,860,281 | 8/1989 | Finley et al. | 370/15 |
| 4,926,442 | 3/1990 | Bukowski et al. | 375/76 |
| 4,945,317 | 7/1990 | Sato et al. | 330/301 |
| 4,984,262 | 1/1991 | Kumozaki et al. | 379/5 |
| 5,060,226 | 10/1991 | Gewin et al. | 370/15 |
| 5,077,782 | 12/1991 | Bushue et al. | 379/5 |
| 5,125,027 | 6/1992 | Blaszykowski et al. | 379/399 |
| 5,140,625 | 8/1992 | Reum et al. | 379/5 |
| 5,224,149 | 6/1993 | Garcia | 379/5 |
| 5,267,237 | 11/1993 | Townley | 370/85.2 |
| 5,398,234 | 3/1995 | O'Connell et al. | 370/15 |
| 5,515,361 | 5/1996 | Li et al. | 370/15 |

OTHER PUBLICATIONS

Sedra S Smith, Microelectronic Circuits, 1987, various pages.

*Primary Examiner*—Douglas W. Olms
*Assistant Examiner*—Matthew C. Phillips

[57] ABSTRACT

An apparatus continuously monitors the T1 output signal from a customer telecommunications equipment to a telecommunications network and provides a substitute input signal to the network whenever the T1 output signal from the customer equipment is interrupted. When the output signal from the customer equipment is present, the apparatus passes through the input and output signals between the customer equipment and the network. When the output signal from the customer equipment is interrupted, the apparatus loops back the output signal from the network into the input to the network, providing the network with a substitute signal. The monitor uses a high impedance, non-intrusive sensing circuit.

34 Claims, 2 Drawing Sheets

APPARATUS FOR PROTECTING A TELECOMMUNICATIONS NETWORK FROM FALSE ALARM CONDITIONS DUE TO T1 LINE SIGNAL INTERRUPTION

BACKGROUND OF THE INVENTION

1. Field of the Invention

The invention disclosed broadly relates to telecommunications networks and more particularly to apparatus for controlling false alarm indications on telecommunications networks.

2. Background Information

Telecommunications T1 carrier equipment at customer sites must be routinely tested. Less frequently a customer's equipment must be upgraded or modified. These activities can cause disruption of the T1 carrier signal back toward the Network Central Office (NCO). This disruption can cause unnecessary alarm signal indications at the NCO and secondary alarms farther back into the network. Such alarm conditions almost always require some form of maintenance activity in order to re-establish the T1 circuit to the customer. Considerable time and effort can be wasted in clearing the alarm conditions and restoring the T1 circuit to the customer.

SUMMARY OF THE INVENTION

An object of the invention is to provide a substitute signal from the customer site whenever the output signal from a customer site is interrupted. Another object is to provide an indication to the customer that the output signal has been interrupted.

The invention provides a substitute T1 signal from the customer site whenever the T1 output signal is interrupted due to conditions at the customer site, such as: equipment failure, maintenance activity, routine equipment changes or power outage.

The customer equipment has a T1 output signal directed toward the network and an input receiving T1 signals from the network. The network has an input receiving the T1 output signal from the customer equipment and has a T1 output signal directed toward the customer equipment. The apparatus comprises a signal monitor and a switching circuit installed as a unit at the customer site at a point in the circuit where the customer T1 line directly interfaces with the network feeder T1 line. The signal monitor continuously monitors the customer T1 output signal directed toward the network. When the customer T1 output signal is normal, the switching circuit has no effect on the normal input and output paths between the network and the customer site. When the customer T1 output signal is disrupted for any reason, the signal monitor causes the switching circuit to loopback the transmission path. This causes the incoming T1 signal from the network to be fed back into the network T1 input. The apparatus continues to monitor the customer T1 output line while in loopback mode. When the customer T1 signal is restored to normal, the signal monitor will detect this and cause the switching circuit to restore the normal input and output paths between the network and the customer site.

The apparatus also provides visual and audible indication of T1 signal failure, as well as a contact closure which can be used for additional indication of T1 signal failure.

DETAILED DESCRIPTION OF THE INVENTION

Figure 1:
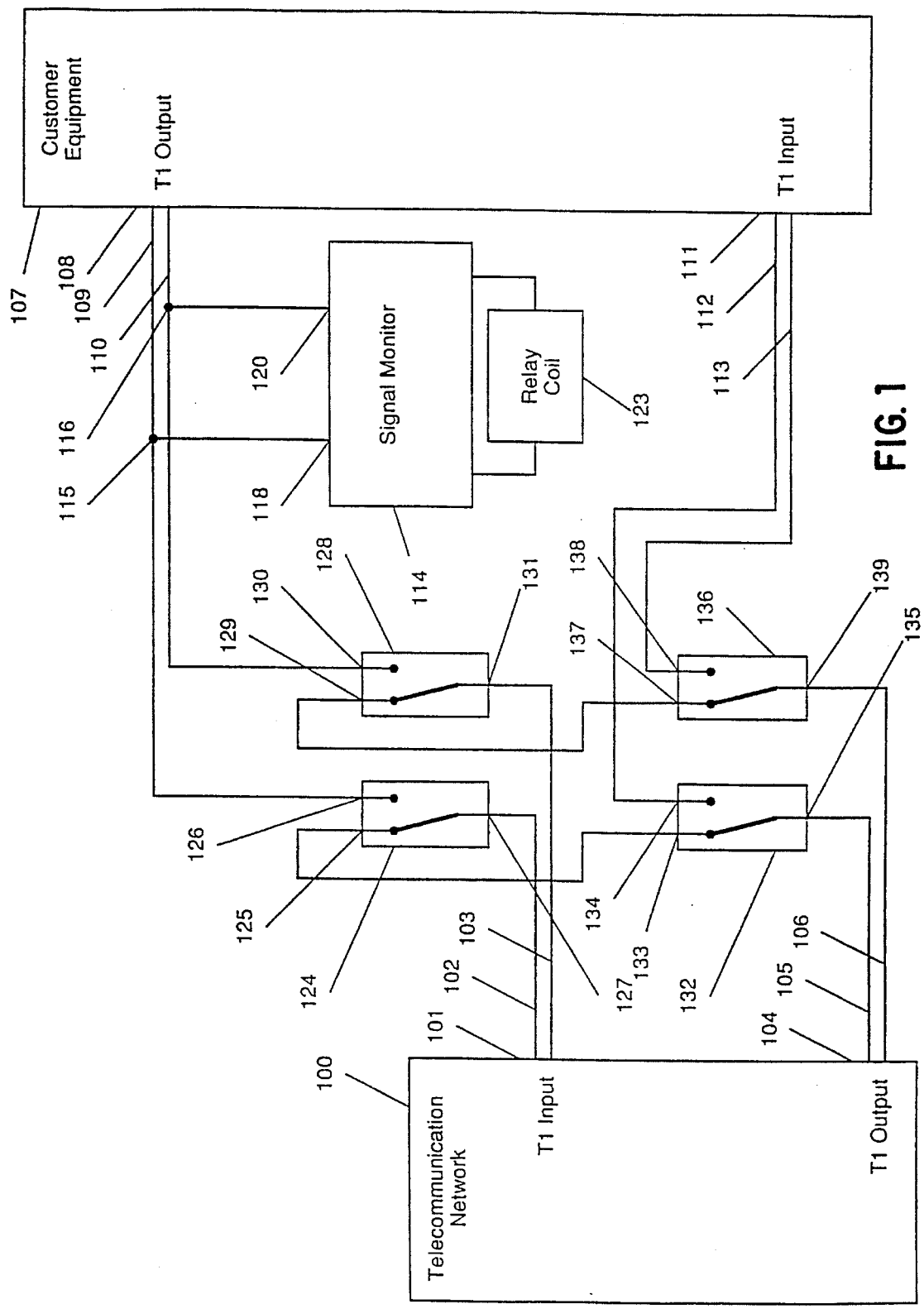
FIG. 1 is a block diagram of the apparatus incorporating principles of the present invention and its connection to network elements.

In FIG. 1, customer equipment interface 107 has a T1 output 108 with two lines 109 and 110, a balanced T1 cable pair, and a T1 input 111 with two lines 112 and 113, a balanced T1 cable pair. Telecommunications network interface has a T1 input 101 with two lines 102 and 103, a balanced T1 cable pair, and a T1 output 104 with two lines 105 and 106, a balanced T1 cable pair. The nominal impedance of T1 cable pairs is 100 ohms. The T1 data rate is 1.544 mega-bits-per second. Due to the encoding method that is employed in the T1 carrier signal format, the frequency of the T1 signal is 772 KHz.

Customer equipment T1 output line 109 is connected to input 118 of signal monitor 114 and to normally open contact 126 of relay 124. Customer equipment T1 line 110 is connected to input 120 of signal monitor 114 and to normally open contact 130 of relay 128. Network T1 input line 102 is connected to pole 127 of relay 124 and network T1 input line 103 is connected to pole 131 of relay 128. Customer equipment input line 112 is connected to normally open contact 134 of relay 132 and customer input line 113 is connected to normally open contact 138 of relay 136. Network output line 105 is connected to pole 135 of relay 132 and network output line 106 is connected to pole 139 of relay 136. Normally closed contact 125 of relay 124 is connected to normally closed contact 133 of relay 132 and normally closed contact 129 of relay 128 is connected to normally closed contact 137 of relay 136.

When relays 124, 128, 132 and 136 are in the actuated condition, poles 127, 131, 135 and 139 connect to contacts 126, 130, 134 and 138 respectively. In this condition, the customer equipment input and output are passed through to the network. Specifically, customer equipment T1 output 108 is coupled to network T1 input 101 and network T1 output 104 is coupled to customer equipment T1 input 111. When relays 124, 128, 132 and 136 are in the non-actuated condition, poles 127, 131, 135 and 139 connect to contacts 125, 129, 133 and 137 respectively. In this condition, network T1 output 104 is looped-back into network T1 input 101.

The signal at customer equipment T1 output 108 is continuously monitored by signal monitor 114. Under normal conditions, when a T1 signal is present at output 108, signal monitor 114 keeps all four relays 124, 128, 132 and 136 activated by supplying current to the relay control coils 123. This allows the customer equipment input and output to be passed through to the network. When the T1 line monitor 114 detects an interruption of the customer equipment T1 output signal, signal monitor 114 stops the current flow to the relay control coils 123, deactivating the relays, causing them to switch and looping back network T1 output 104 into network T1 input 101.

Figure 2:
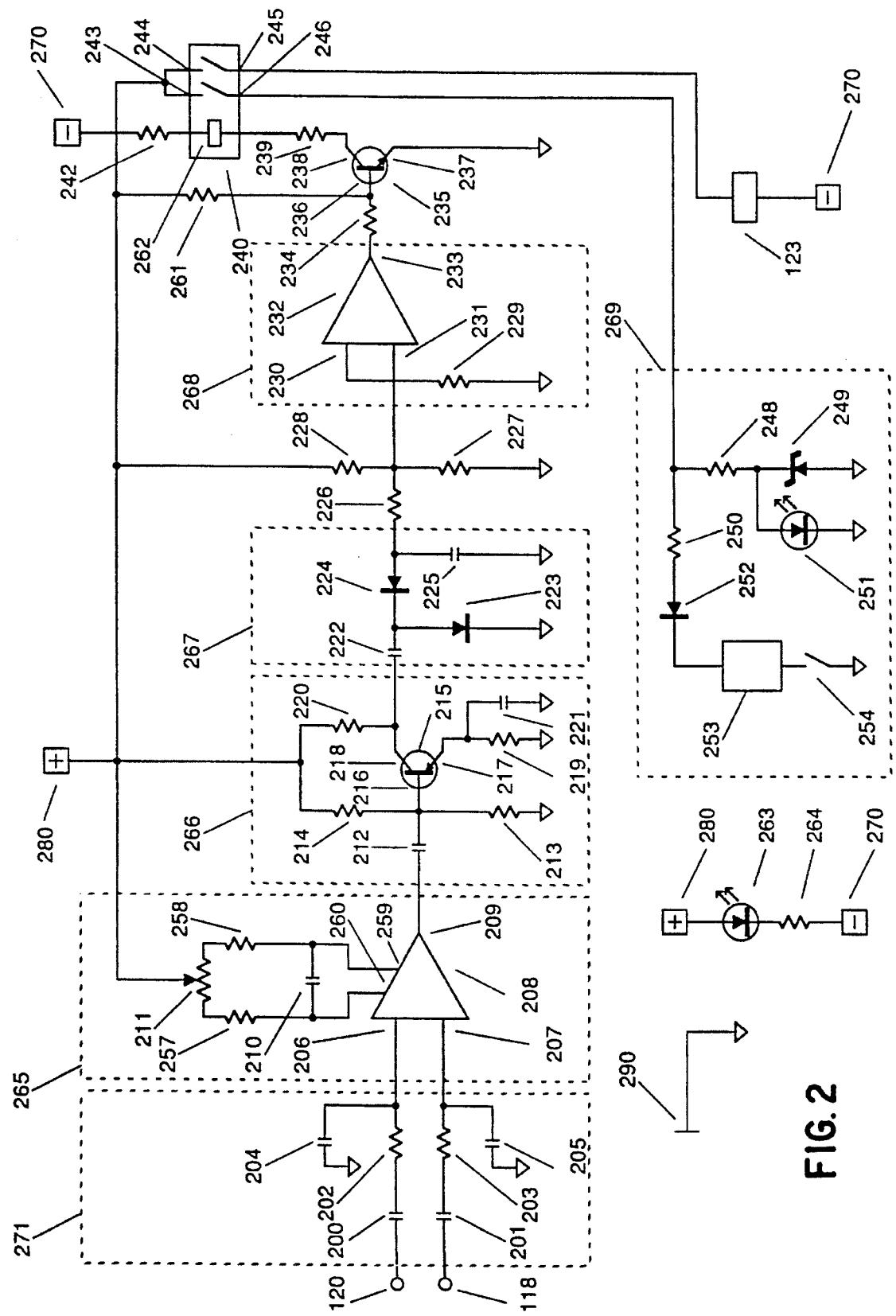
FIG. 2 is a detailed schematic diagram of a signal monitor shown in FIG. 1.

In FIG. 2, the circuitry of the signal monitor 114 is shown. The T1 signal being monitored is applied to input stage 265 through input network 271. Input stage 265 includes balanced differential amplifier 208 which provides circuit isolation and conversion from balanced to unbalanced configuration. The output signal is then applied to transistor amplifier stage 266, which provides AC amplification sufficient to drive the next stage, negative peak detector 267.

Negative peak detector 267 rectifies the AC signal and provides a DC level which is applied to the next stage, voltage comparator 268. Voltage comparator 268 produces a two-state output signal which is then used to control switching of transistor 235 which controls switching of relay 240. Relay 240, in turn, controls switching of the relays 124, 128, 132 and 136.

Signal monitor 114 is connected to an standard bipolar DC power supply which is not part of the invention and is not shown. The connection is made by three terminals: terminal 280 is connected to the positive voltage output of the DC power supply, terminal 270 is connected to the negative voltage output of the DC power supply and terminal 290 is connected to the common output of the DC power supply.

Signal monitor 114 is connected to the customer equipment T1 output 108 by input network 271. Network 271 includes a first capacitor 201 connected to the first T1 line output 109 and a second capacitor 200 connected to the second T1 line output 110. These capacitors provide necessary DC blocking. Capacitor 201 is connected to the input to a first low pass filter formed by resistor 203 and capacitor 205. Capacitor 200 is connected to the input to a second low pass filter formed by a resistor 202 and a capacitor 204.

The outputs from network 271 are applied to the inputs to input stage 265. The output 256 from the first low pass filter, at the junction of resistor 202 and capacitor 204, is connected to a first input 206 of differential amplifier 208. The output 255 from the second low pass filter, at the junction of resistor 203 and capacitor 205, is connected to a second input 207 of differential amplifier 209. The differential amplifier 208 provides circuit isolation and conversion from a balanced to an unbalanced configuration. A high frequency, high input impedance, balanced differential amplifier should be used. High frequency response is necessary because the AC signal to be amplified has a frequency of 772 KHz. High input impedance is necessary so that together with the impedances of the first and second low pass filters, the input to the signal monitor presents a high bridging impedance load to the T1 circuit being monitored. This results in the signal monitor having minimal effect on the signal being monitored. In the preferred embodiment, the differential amplifier used is a National Semiconductor LM-6361, capacitors 200 and 201 are 33 pF, resistors 202 and 203 are 2700 ohms and capacitors 204 and 205 are 820 pF. This results in a bridging impedance of over 16000 ohms at the T1 signal frequency. This is more than 160 times the nominal 100 ohm characteristic impedance of the T1 lines being monitored. This is in keeping with industry standards for input impedance of a device bridging a working T1 line. The network formed by resistors 257 and 258, variable resistor 211 and capacitor 210 are connected to inputs 259 and 260 of differential amplifier 208 and provide output offset adjustment as is well known in the art.

The output from input stage 265 is applied to the input to transistor amplifier stage 266. The output 209 from differential amplifier 208 is capacitively coupled through capacitor 212 to the base 216 of bipolar npn transistor 215. Resistor 213 together with resistor 214 provide the DC bias for transistor 215. Resistor 219 together with capacitor 221 provide the emitter load for transistor 215. Resistor 220 is connected between the collector 218 of transistor 215 and positive DC supply 280. The transistor 215 provides AC amplification which to drive the next stage, negative peak detector 267. When the T1 signal is present, the output from transistor 215, the signal at collector 218, has a peak to peak AC voltage much greater than when no T1 signal is present.

The output from transistor amplifier stage 266 is applied to the input of negative peak detector 267. The output signal from transistor 215, present at its collector 218, is applied to negative peak detector 267 through capacitor 222, which provides DC blocking. Diode 223 and diode 224 together form the negative peak detector which rectifies the AC input signal and provide a negative DC signal which is filtered by capacitor 225. The output is a negative DC level which changes in response to the presence or absence of the customer equipment T1 output signal. When the T1 signal is present, the output from the negative level detector, the anode of diode 224, is a negative DC voltage. When the T1 signal is absent, the voltage output is near zero, that is, close to the level of common 290.

The DC output from negative peak detector is applied to voltage comparator stage 268. The signal is applied to op amp 232 through resistor 226. Together, resistor 228 and resistor 228 provide the proper DC bias for the input 231 of op amp 232. Resistor 229 provides the proper DC bias for the input 230 of op amp 231. Operational amplifier 231 is used as a voltage comparator to provide a high or low two-state output to drive transistor 235. With a T1 signal present, the negative DC voltage from the negative level detector drives the output of op amp 232 to a negative DC voltage. With the T1 signal absent, the input 231 of op amp 232 is biased by resistors 228 and 227 to a positive level, driving the output 233 of op amp 232 to a positive DC voltage.

The output signal of op amp 232, present at output 235, is applied through resistor 234 to the base 236 of bipolar pnp transistor 235. Resistor 261 provides the DC bias for transistor 235. With a T1 signal present, the negative DC voltage from op amp 232 drives transistor 235 to conduct, causing the collector 238 of transistor 235 to be at near zero voltage, i.e., a near common level. This causes current to flow through resistor 239, relay coil 262, and resistor 242, activating the relay coil and closing the relay 241. Positive DC voltage is then applied through closed contacts 244 and 245 to the relay coil 123, the other side of which is connected to negative DC supply 270. This activates relay control 123 causing relays 124, 128, 132 and 136 to switch as described above.

In one embodiment, relays 124, 128, 132 and 136 are separate single pole, double throw relays and relay control 123 comprises their four relay coils connected in parallel. It is seen by one of skill in the art that other equivalent embodiments are possible. Relay configurations with multiple isolated contacts are available. For example, other equivalent embodiments are the use of two double pole, double throw relays or the use of one four pole, double throw relay instead of the four separate relays. Other equivalent embodiments are possible as well. Relays with mercury wetted contacts are used so as to provide minimal contact resistance in the balanced T1 line, and to ensure noise free switching of the T1 lines.

Positive DC voltage is applied through closed contacts 243 and 246 to the visual indicator comprising resistor 248, zener diode 249 and light emitting diode 251 and to the audible indicator comprising resistor 250, diode 252 and audible alarm 253. Switch 254 allows the audible indicator to be disabled if desired. In addition, the contact pair comprising contacts 243 and 246, which are isolated from the T1 line, can be used to actuate other indicators.

DC power supply operation is indicated by light emitting diode 263, which, in series with resistor 264, is connected between the positive power supply terminal 280 and the negative power supply terminal 270.

Although several embodiments of the invention have been disclosed, it will be seen by those of skill in the art that other embodiments which are equivalent are possible.

What is claimed is:

1. In a telecommunications network, an apparatus for providing a substitute T1 signal from a customer equipment to the network whenever a T1 output signal from the customer equipment is interrupted, comprising:

a) means for detecting the presence or absence of a T1 output signal from a customer equipment, coupled to the customer equipment; and b) switching means for providing a substitute T1 signal to a network whenever the T1 output signal from the customer equipment is interrupted, coupled to the signal detecting means.

2. The apparatus of claim 1, further comprising:

means for indicating the interruption of the T1 output signal to the customer, coupled to the signal detecting means.

3. The apparatus of claim 2, wherein the signal detecting means comprises:

a) means for converting the T1 signal from balanced to unbalanced configuration, coupled to the customer equipment;

b) means for amplifying the signal, coupled to the converting means;

c) means for rectifying the signal, coupled to the amplifying means; and d) means for controlling the switching means, coupled to the rectifying means and the switching means.

4. The apparatus of claim 3, wherein the switching means comprises:

means for looping back a T1 output from the network into a T1 input to the network.

5. The apparatus of claim 3, wherein the switching means comprises:

a relay.

6. The apparatus of claim 5 further comprising:

a pair of relay contacts isolated from the T1 line which switch in response to the signal detection means.

7. The apparatus of claim 3, wherein the switching means comprises:

a mercury-wetted relay.

8. An apparatus for providing a substitute T1 signal whenever the output T1 signal from a first network element is interrupted, the first network element having a first T1 input and a T1 first output, and the second network element having a second T1 input and a second T1 output, the apparatus comprising:

a) a signal monitor, coupled to the first T1 output, generating an output signal with two states in response to the signal on the first T1 output, the first state present when the T1 signal is present, the second state present when the T1 signal is absent; and b) a switcher, coupled to the signal monitor and responsive to the output signal from the signal monitor, and coupled to the first T1 input, the first T1 output, the second T1 input and the second T1 output, which connects the first T1 output to the second T1 input and the second T1 output to the first T1 input, when the output signal is in the first state, and which connects the second T1 output line to the second T1 input line, when the output signal is in the second state.

9. The apparatus of claim 8, wherein the signal monitor comprises:

a) a high impedance differential amplifier having a balanced input and an unbalanced output, the input coupled to the first T1 output line, which amplifies the signal on the line and converts it from balanced to unbalanced configuration;

b) a negative peak detector having an input and an output, the input coupled to the output of the differential amplifier, which rectifies the signal output from the differential amplifier;

c) a voltage comparator having an input and an output, the input coupled to the output of the negative peak detector, generating a two state output signal, one state representing the presence of a T1 signal on the line, the other representing the absence of a T1 signal on the line.

10. The apparatus of claim 9, wherein the signal monitor further comprises:

means, coupled to the output of the voltage comparator, and responsive to the two-state signal, for controlling the switcher.

11. The apparatus of claim 10, wherein the switcher comprises:

at least one relay.

12. The apparatus of claim 11 further comprising:

means, coupled to the output of the signal monitor, for visually indicating the state of the two-state signal.

13. The apparatus of claim 11 further comprising:

means, coupled to the output of the signal monitor, for audibly indicating the state of the two-state signal.

14. The apparatus of claim 11 further comprising:

a pair of relay contacts isolated from the T1 line which switch in response to the two-state signal.

15. The apparatus of claim 10, wherein the switcher comprises:

at least one mercury-wetted relay.

16. An apparatus for controlling false alarm indications in a telecommunications network, the telecommunications network comprising a first network element, having a T1 output signal coupled to a second network element, the apparatus comprising:

a detector, coupled to the T1 output signal between a first and second network elements, detecting the absence of the T1 output signal from the first network element; and a protection device, responsive to the detection of the absence of the T1 output signal from the first network element, protecting the second network element from the absence of the T1 output signal.

17. The apparatus of claim 16, wherein the detector comprises:

a signal monitor, responsive to the peak-to-peak amplitude of the T1 output signal and generating an output signal indicating the absence of the T1 output signal, when the peak-to-peak amplitude of the T1 output signal is less than a predetermined level.

18. The apparatus of claim 17, wherein the protection device comprises:

a switcher, looping back an output T1 signal from the second network element to a T1 input of the second network element whenever the signal monitor output signal indicates the monitored T1 signal is absent.

19. The apparatus of claim 18, wherein the signal monitor comprises:

a converter, coupled to the T1 output signal, converting the T1 output signal from balanced to unbalanced configuration;

an amplifier, coupled to the converting means, amplifying the signal;

a rectifier, coupled to the amplifying means, rectifying the signal; and a controller, coupled to the rectifying means and the switching means, controlling the switcher.

20. The apparatus of claim 16, further comprising:

an indicator responsive to the detection of the absences of the T1 output signal from the first network element indicating the absence of the T1 to the customer.

21. The apparatus of claim 16 further comprising:

a pair of relay contacts isolated from the T1 line which switch responsive to the detection of the absence of the T1 output signal from the first network element.

22. In a telecommunications network, an apparatus for providing a substitute T1 signal from a customer equipment to the network whenever a T1 output signal from the customer equipment is interrupted, comprising:

a) means for detecting the presence or absence of a T1 output signal from a customer equipment, coupled to the customer equipment, comprising:

means for convening the T1 signal from balanced to unbalanced configuration, coupled to the customer equipment, means for amplifying the signal, coupled to the convening means, means for rectifying the signal, coupled to the amplifying means, and means for controlling the switching means, coupled to the rectifying means and the switching means;

b) switching means for providing a substitute T1 signal to a network whenever the T1 output signal from the customer equipment is interrupted, coupled to the signal detecting means; and c) means for indicating the interruption of the T1 output signal to the customer, coupled to the signal detecting means.

23. The apparatus of claim 22, wherein the switching means comprises:

means for looping back a T1 output from the network into a T1 input to the network.

24. The apparatus of claim 22, wherein the switching means comprises:

a relay.

25. The apparatus of claim 24 further comprising:

a pair of relay contacts isolated from the T1 line which switch in response to the signal detection means.

26. The apparatus of claim 22, wherein the switching means comprises:

a mercury-wetted relay.

27. An apparatus for providing a substitute T1 signal whenever the output T1 signal from a first network element is interrupted, the first network element having a first T1 input and a T1 first output, and the second network element having a second T1 input and a second T1 output, the apparatus comprising:

a) a signal monitor, coupled to the first T1 output, generating an output signal with two states in response to the signal on the first T1 output, the first state present when the T1 signal is present, the second state present when the T1 signal is. absent, comprising:

a high impedance differential amplifier having a balanced input and an unbalanced output, the input coupled to the first T1 output line, which amplifies the signal on the line and converts it from balanced to unbalanced configuration, a negative peak detector having an input and an output, the input coupled to the output of the differential amplifier, which rectifies the signal output from the differential amplifier, and a voltage comparator having an input and an output, the input coupled to the output of the negative peak detector, generating a two state output signal output signal, one state representing the presence of a T1 signal on the line, the other representing the absence of a T1 signal on the line; and b) a switcher, coupled to the signal monitor and responsive to the output signal from the signal monitor, and coupled to the first T1 input, the first T1 output, the second T1 input and the second T1 output, which connects the first T1 output to the second T1 input and the second T1 output to the first T1 input, when the output signal is in the first state, and which connects the second T1 output line to the second T1 input line, when the output signal is in the second state.

28. The apparatus of claim 27, wherein the signal monitor further comprises:

a controller, coupled to the output of the voltage comparator, responsive to the two-state signal, controlling the switcher.

29. The apparatus of claim 28, wherein the switcher comprises:

at least one relay.

30. The apparatus of claim 29 further comprising:

a visual indicator, coupled to the output of the signal monitor, visually indicating the state of the two-state signal.

31. The apparatus of claim 29 further comprising:

an audible indicator, coupled to the output of the signal monitor, audibly indicating the state of the two-state signal.

32. The apparatus of claim 29 further comprising:

a pair of relay contacts isolated from the T1 line which switch in response to the two-state signal.

33. The apparatus of claim 28, wherein the switcher comprises:

at least one mercury-wetted relay.

34. An apparatus for controlling false alarm indications in a telecommunications network, the telecommunications network comprising a plurality of network elements interconnected by T1 signals, the apparatus comprising, a detector, detecting the absence of a T1 output signal from a first network element, comprising:

a signal monitor, monitoring the peak-to-peak amplitude of the T1 output signal and generating an output signal indicating the absence of the T1 output signal, comprising:

a converter, coupled to the T1 output signal, converting the T1 output signal from balanced to unbalanced configuration, an amplifier, coupled to the converting means, amplifying the signal, a rectifier, coupled to the amplifying means, rectifying the signal; and a controller, coupled to the rectifying means and the switching means, controlling the switcher; and a protection device, responsive to the detection of the absence of the T1 output signal from the first network element, protecting a second network element from the absence of the T1 output signal, comprising:

a switcher, looping back an output T1 signal from the second network element to a T1 input of the second network element whenever the signal monitor output signal indicates the monitored T1 signal is absent.

* * * * *